(12) United States Patent
Hines, III et al.

(10) Patent No.: US 8,422,989 B1
(45) Date of Patent: Apr. 16, 2013

(54) METHOD AND SYSTEM FOR ENCODING TELECOMMUNICATIONS USER INFORMATION

(75) Inventors: Thomas Edward Hines, III, Belton, MO (US); Victoria L. Zeller, Kansas City, MO (US); Hilah A. Rozier, Lenexa, KS (US); Steven I. Zweifach, Alexandria, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 970 days.

(21) Appl. No.: 12/330,628

(22) Filed: Dec. 9, 2008

(51) Int. Cl.
*H04M 11/00* (2006.01)

(52) U.S. Cl.
USPC .................. 455/406; 455/456.1; 379/121.05

(58) Field of Classification Search ............... 379/121.05
See application file for complete search history.

(56) References Cited

U.S. PATENT DOCUMENTS

| | | | |
|---|---|---|---|
| 7,499,418 B2 * | 3/2009 | Oprescu-Surcobe et al. | 370/311 |
| 2003/0165224 A1 * | 9/2003 | Moss et al. | 379/207.13 |
| 2004/0174974 A1 * | 9/2004 | Meek et al. | 379/210.02 |
| 2004/0242238 A1 * | 12/2004 | Wang et al. | 455/456.1 |
| 2007/0282796 A1 * | 12/2007 | Evenhaim | 707/3 |

OTHER PUBLICATIONS

CeDaR News, vol. 1, Issue 1, Jun. 2002, pp. 1-4.*

* cited by examiner

*Primary Examiner* — Rafael Pérez-Gutiérrez
*Assistant Examiner* — German Viana Di Prisco

(57) ABSTRACT

A computer system comprises a communication interface and a processing system. The user interface is configured to receive a plurality of communications requesting location information for a plurality of mobile devices engaged in communication sessions with a communication network. The processing system is configured to generate a plurality of records associated with the plurality of communications wherein the plurality of records comprises user information expressed in an initial format, process the plurality of records with a plurality of keys to encode the user information to generate encoded user information, and process the encoded user information to verify that the encoded user information satisfies the initial format. Upon determining that the encoded user information satisfies the initial format, the communication interface is configured to transfer the encoded user information for analysis.

18 Claims, 9 Drawing Sheets

| KEY | REC | SOURCE | DESTINATION | DATE | START TIME | STOP TIME | DURATION |
|---|---|---|---|---|---|---|---|
| 1 | 1 | 303-999-5566 | 800-786-9199 | 08/05/08 | 10:30 | 11:20 | 50 |
| 2 | 2 | 505-555-5555 | 571-272-1000 | 09/15/08 | 13:00 | 14:25 | 85 |
| 4 | 3 | 321-456-7890 | 419-444-0246 | 10/07/08 | 10:30 | 11:20 | 50 |
| 7 | 4 | 123456789-123 | 849254261-345 | 10/14/08 | 1:00 | 1:20 | 20 |
| 9 | 5 | 999-xyz-1234 | 123-abc-4900 | 10/15/08 | 11:30 | 12:00 | 30 |
| | | | | | | | |

| KEY | REC | SOURCE | DESTINATION | DATE | START TIME | STOP TIME | DURATION |
|---|---|---|---|---|---|---|---|
| 1 | 1 | 292-888-4455 | 799-675-8088 | 08/05/08 | 10:30 | 11:20 | 50 |
| 2 | 2 | 354-233-5321 | 007-823-2794 | 09/15/08 | 13:00 | 14:25 | 85 |
| 4 | 3 | 765-890-1234 | 853-888-4680 | 10/07/08 | 10:30 | 11:20 | 50 |
| 7 | 4 | 890123456-890 | 516921938-012 | 10/14/08 | 1:00 | 1:20 | 20 |
| 9 | 5 | 888-ghi-0123 | 012-jkl-3899 | 10/15/08 | 11:30 | 12:00 | 30 |
| | | | | | | | |

METHOD AND SYSTEM FOR ENCODING TELECOMMUNICATIONS USER INFORMATION

TECHNICAL BACKGROUND

When a user of a telecommunications device requests a communication service from a network service provider, information associated with the service request may be generated. One type of such information is Customer Proprietary Network Information (CPNI). CPNI may include identifying information about a user, the time, date, duration, and destination number of a call, the type of service the user subscribes to, or other information that appears on the user's bill.

Network service providers may distribute such user information to third party companies for analysis. However, the disclosure of personal user information raises significant privacy concerns. Therefore, network service providers must strictly control the distribution of private user information to third parties.

OVERVIEW

A computer system comprises a communication interface and a processing system. The user interface is configured to receive a plurality of communications requesting location information for a plurality of mobile devices engaged in communication sessions with a communication network. The processing system is configured to generate a plurality of records associated with the plurality of communications wherein the plurality of records comprises user information expressed in an initial format, process the plurality of records with a plurality of keys to encode the user information to generate encoded user information, and process the encoded user information to verify that the encoded user information satisfies the initial format. Upon determining that the encoded user information satisfies the initial format, the communication interface is configured to transfer the encoded user information for analysis.

A method of operating a communication system comprises receiving a plurality of communications requesting location information for a plurality of mobile devices engaged in communication sessions with a communication network, generating a plurality of records associated with the plurality of communications wherein the plurality of records comprises user information expressed in an initial format, processing the plurality of records with a plurality of keys to encode the user information to generate encoded user information, processing the encoded user information to verify that the encoded user information satisfies the initial format, and upon determining that the encoded user information satisfies the initial format, transferring the encoded user information for analysis.

A method of operating a communication system comprises receiving a plurality of communications from a plurality of communication devices engaged in communication sessions with a communication network, generating a plurality of records associated with the plurality of communications wherein the plurality of records comprises user information expressed in an initial format, processing the plurality of records with a plurality of keys to encode the user information to generate encoded user information, processing the encoded user information to verify that the encoded user information satisfies the initial format, and upon determining that the encoded user information satisfies the initial format, transferring the encoded user information for analysis.

BRIEF DESCRIPTION OF THE DRAWINGS

FIG. 5 illustrates an example call log.

FIG. 6 illustrates an example call log.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Described herein is a method and system for encoding user information generated during requests for service from a communication network service provider. For example, the user may request a location based service using a mobile communication device, such as locating a restaurant in the user's proximity or discovering the nearest automatic teller machine. When a user requests such a service, user information and other details about the request may be generated and stored by the service provider.

The service provider may desire to transfer the generated information to a third party for analysis. However, the privacy of the user's personal information must be protected. By employing the method and system described herein, the user information can be masked by processing the information with a key to encode the user information. The encoded user information is then verified to ensure the encoded information satisfies the initial format of the information. For example, an encoded ten digit telephone number would remain a series of ten digits. Further verification could also be performed to ensure an encoded telephone number is a valid number capable of resulting in a successful connection when dialed, so that the information remains usable for simulations, troubleshooting, and other data analysis. Advantageously, by storing the key used to encode the user information, if additional information associated with the user information is generated, the additional information can be encoded using the same key and correlated with the associated user information. In addition, encoded user information can be decoded by the service provider using the key in order to recover the initial user information.

Figure 1:
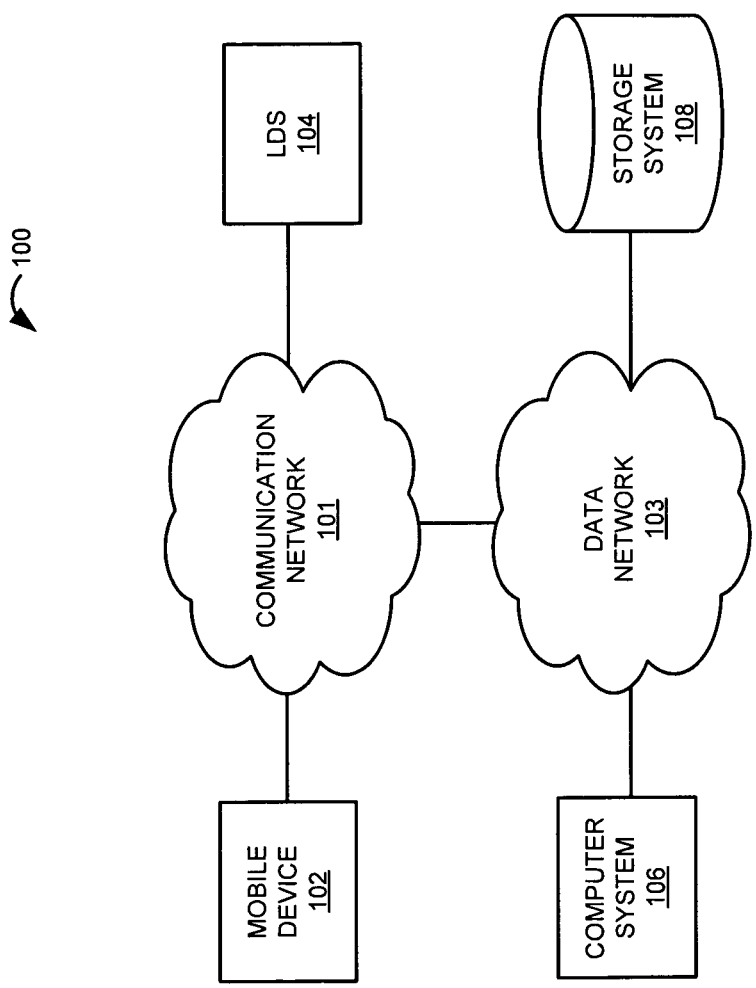
FIG. 1 is a block diagram that illustrates a communication system.

FIG. 1 illustrates communication system 100. Communication system 100 comprises communication network 101, mobile device 102, data network 103, location determination system (LDS) 104, computer system 106, and storage system 108. Mobile device 102 and location determination system 104 are in communication with communication network 101. Communication network 101 is in communication with data network 103. Computer system 106 and storage system 108 are in communication with data network 103. Note that the number of mobile devices depicted in FIG. 1 would typically be greater, but only a single device is shown herein for clarity.

Mobile device 102 may be any device that has wireless communication connectivity. Mobile device 102 comprises hardware and circuitry programmed to function as a telecommunications device. For example, mobile device 102 could comprise a telephone, transceiver, smartphone, mobile phone, cellular phone, personal digital assistant (PDA), personal communicator, handheld game console, Internet access device, personal computer (PC), Ultra-Mobile personal computer (UMPC), handheld television, or some other consumer appliance with wireless communication capabilities—including combinations thereof.

Mobile device 102 is in communication with communication network 101 using the air or space as the transport media. Mobile device 102 may communicate with communication network 101 using various wireless protocols, such as wireless fidelity, Code Division Multiple Access (CDMA), Global System for Mobile communications (GSM), Worldwide Interoperability for Microwave Access (WiMAX), Long Term Evolution (LTE), Internet, telephony, or some other communication format—including combinations thereof.

Communication network 101 may comprise any network that provides communication connectivity for mobile device 102 to send and receive data. Communication network 101 may comprises wireless communication nodes, telephony switches, internet routers, network gateways, computer systems, communication links, or some other type of communication equipment—including combinations thereof. Wireless network protocols that may be utilized by communication network 101 may comprise Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), or any other wireless network protocol that facilitates communication between communication network 101 and mobile device 102.

Communication network 101 is in communication with data network 103. Communication network 101 communicates with data network 103 using metal, glass, optical fiber, air, or some other material as the transport media. The communication link between communication network 101 and data network 103 may be a direct link or may include various intermediate communication nodes, systems, or networks.

Data network 103 comprises a communication network capable of providing a communication service to computer system 106 and storage system 108. For example, data network 103 could comprise a packet-switched network, such as the Internet, a cellular network, a public switched telephone network (PSTN), an asynchronous transfer mode (ATM) network, a personal communication service (PCS) network, a local area network (LAN), a wide area network (WAN), or any other network that provides a communication service. Moreover, data network 103 could comprise any of the public switched data networks (PSDNs) such as an Internet Protocol network (Internet), Frame Relay, General Packet Radio Service (GPRS), Ethernet, and others.

Location determination system 104 is capable of determining the location of mobile device 102. Location determination system 104 comprises hardware, software, and circuitry capable of locating mobile device 102 in a multitude of ways. It will be understood that the location may be determined using various methodologies, such as network-based, device-based, a hybrid of network-based and device-based, or simply retrieving location information from a database.

Examples of device-based location determination methods include satellite positioning techniques such as the Global Positioning System (GPS). Examples of network-based location methods include cell identification techniques, such as Cell of Origin (COO) and control plane locating. In another example, location determination system 104 could employ trilateration, multilateration, or triangulation location techniques. In another example, location determination system 104 may determine the location of mobile device 102 by identifying the switch that mobile device 102 registered with.

Computer system 106 comprises a communication interface, processing system, a storage device, and a user interface. The user interface includes a display device. The storage device stores operating software. Computer system 106 may be a discrete system or may be integrated within other systems. Computer system 106 may reside in a single device or may be distributed across multiple devices.

The communication interface comprises communication circuitry and equipment that communicates over data network 103. The processing system comprises microprocessors or other logic circuitry that retrieves and executes the operating software from the storage device. The storage device comprises a disk, integrated circuit, flash drive, or some other memory device. The user interface comprises a keyboard, mouse, voice recognition interface, touch screen, or some other user device. The display device comprises a liquid crystal display, cathode ray tube display, or some other graphical display mechanism. The above-described components of computer system 106 may be integrated together or distributed among multiple devices.

The operating software comprises an application program, firmware, or some other form of machine-readable processing instructions. The operating software may include an operating system, utilities, drivers, networking, and applications. When executed by the processing system, the operating software directs computer system 106 to operate as described herein.

Storage system 108 could comprise a disk, tape, integrated circuit, server, or some other memory device. Storage system 108 may reside in a single device or may be distributed among multiple memory devices. In one embodiment, storage system 108 is only accessible by a service provider that provides a communication service over communication network 101. Under this embodiment, no entity external to the service provider may access storage system 108, through the use of a firewall or other data security techniques known to those skilled in the art.

It will be understood that the foregoing communication system 100 is illustrative only, and that many other arrangements of equipment, components, and interfaces can be used in lieu of those described above or may be omitted in their entirety. Those skilled in the art will understand and appreciate that much of the foregoing descriptions herein are functional in nature and may be implemented as hardware, firmware, or software as individual apparatus or in conjunction with other components, in any suitable combination, manner, and location.

Figure 2:
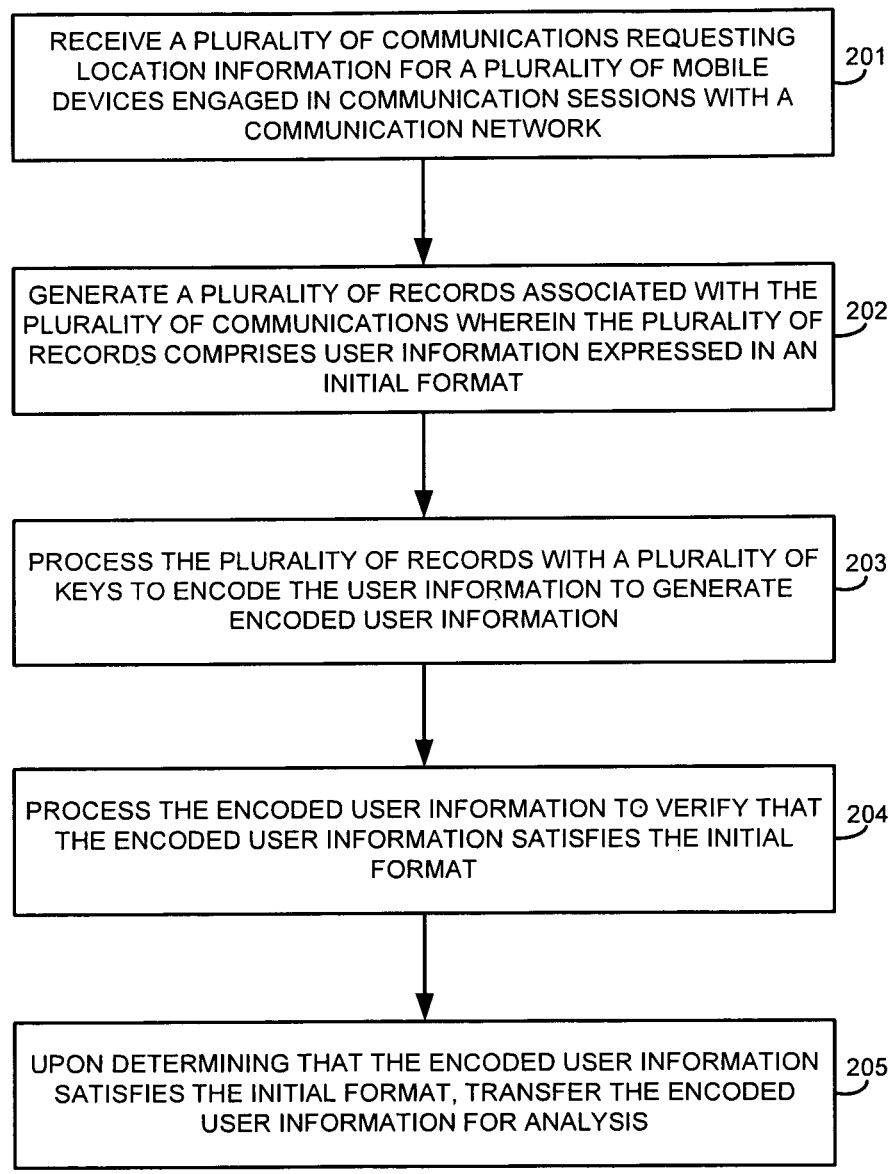
FIG. 2 is a flow diagram that illustrates a method of operating a communication system.

FIG. 2 illustrates an operation of communication system 100. The steps of the operation are shown parenthetically. The operation begins with communication network 101 receiving a plurality of communications requesting location information from location determination system 104 for a plurality of mobile devices such as mobile device 102 engaged in communication sessions with communication network 101 (201). Computer system 106 then generates a plurality of records associated with the plurality of communications wherein the plurality of records comprises user information expressed in an initial format (202). The plurality of records could include, for example, Call Detail Records (CDRs), Wireless 911/Safety First (W911/SF) log files, or Location Manager (LM) log files. The user information comprises any identifying or sensitive information subject to privacy legislation. Examples of user information include a telephone number, Electronic Serial Number (ESN), Mobile Station Identifier (MSID), Mobile Equipment Identifier (MEID), International Mobile Equipment Identity (IMEI), User Identity Module Identifier (UIMI), or Customer Proprietary Network Information (CPNI).

Computer system 106 processes the plurality of records with a plurality of keys to encode the user information to generate encoded user information (203). The plurality of keys could comprise any algorithm which modifies the digits and characters of the user information. For example, a simple key could comprise incrementing every digit and character of user information by one. In another example, the encoded user information could be generated by randomizing every digit or character of the user information, in which case the key could comprise a table of the unmodified user information and the corresponding encoded user information. In one embodiment, the plurality of keys is stored in storage system 108.

Computer system 106 processes the encoded user information to verify that the encoded user information satisfies the initial format (204). Computer system 106 verifies that the encoded user information satisfies the initial format so that the encoded user information is compatible with simulations and other data analysis procedures performed by external entities. For example, if the user information is a ten digit telephone number, computer system 106 verifies that the encoded user information remains in a valid telephone number format. In one example, this verification is achieved by determining that the first and fourth digits of the encoded user information are not a zero or a one. In another example, computer system 106 verifies that the first three digits of the encoded user information do not indicate a service, such as 9-1-1 emergency service or 4-1-1 directory assistance. In yet another example, computer system 106 also verifies that the encoded user information is unique from all other encoded user information.

Upon determining that the encoded user information satisfies the initial format, computer system 106 transfers the encoded user information for analysis (205). In one example, computer system 106 transfers the encoded user information to storage system 108. Under this example, computer system 106 may replace the user information in storage system 108 with the encoded user information, or may store the encoded user information along with the user information in storage system 108, or combinations of both.

In another example, computer system 106 transfers the encoded user information to an entity internal to a service provider that provides a communication service over communication network 101. The entity internal to the service provider could comprise a department or branch of the service provider, or storage system 108. In another embodiment, computer system 106 transfers the encoded user information to an entity external to the service provider for analysis. The entity external to the service provider could comprise any individual or organization that provides a data analysis service for the service provider. After receiving the encoded user information, the external entity could view and process records comprising the encoded user information and, advantageously, the records would remain usable for simulations, troubleshooting, and other data analysis.

In another example, the plurality of records is modified to replace the user information with the encoded user information. The plurality of records is then transferred to an external entity for data analysis. If the external entity discovers a problem in a record, the problem data is exported for analysis by agents of an entity internal to the service provider. The internal agents match the key for the problem record to the key for the associated user information. In one example, the keys are matched by searching storage system 108 for the encoded user information of the problem record and the corresponding user information. The encoded user information is then modified to the original user information. Once the original user information is restored, this user information can be used to locate the contents of the original, unmodified record. The internal analysts can then identify the problem record and determine the cause of the problem.

In another embodiment, computer system 106 receives an additional record after receiving the plurality of communications in operation 201. The additional record comprises additional user information. Computer system 106 determines a record from the plurality of records that is associated with the additional record. For example, if the additional record comprises a telephone number, computer system 106 would determine a similar record comprising that same telephone number. Computer system 106 then determines a key of the plurality of keys used to encode the encoded user information of the record. In one example, the key is determined by identifying the user information associated with the encoded user information which is correlated in a table.

After computer system 106 determines the key used to encode the user information, the additional user information of the additional record is encoded using the key. In one example, the encoded user information is the key, so the additional user information is encoded by changing the information to the corresponding encoded user information. In this manner, the additional user information associated with the previously encoded user information is encoded with the same key used to encode the previously encoded user information. Advantageously, records associated with the encoded additional user information can then be correlated with records associated the previously encoded user information.

Figure 3:
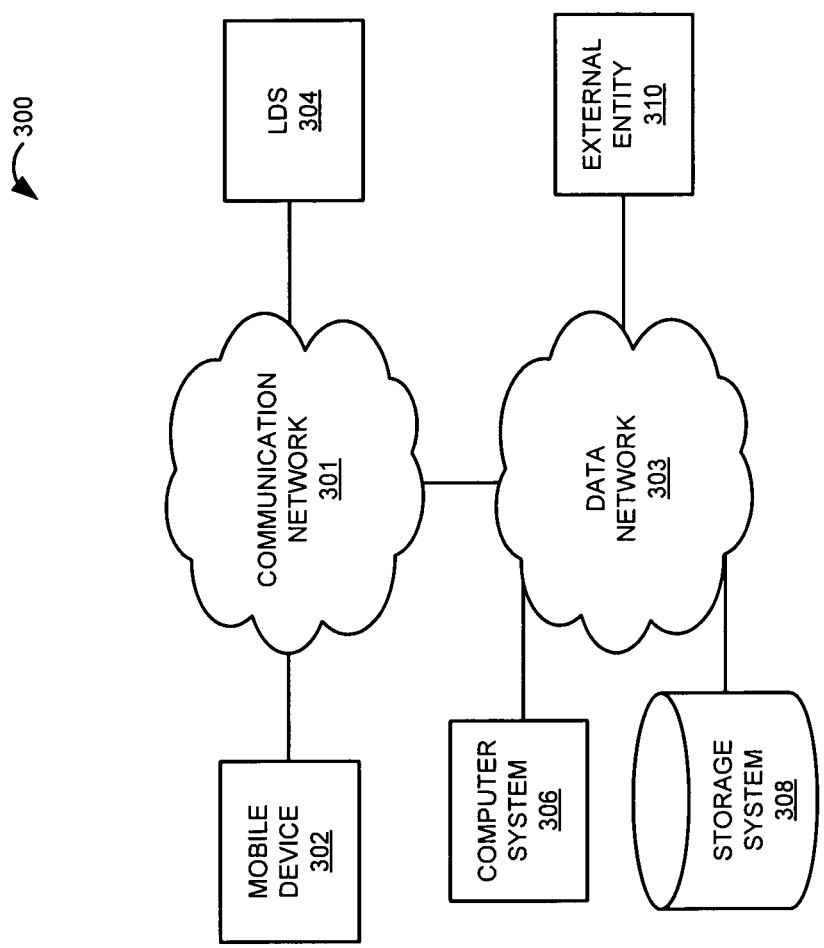
FIG. 3 is a block diagram that illustrates a communication system.

FIG. 3 illustrates communication system 300. FIG. 3 is provided as an example of a communication system that includes a third party in communication with a network service provider over a data network. Communication system 300 comprises communication network 301, mobile device 302, data network 303, location determination system (LDS) 304, computer system 306, storage system 308, and external entity 310. Mobile device 302 and location determination system 304 are in communication with communication network 301. Communication network 301 is in communication with data network 303. Computer system 306, storage system 308, and external entity 310 are in communication with data network 303.

External entity 310 comprises a third party distinct from a service provider that provides a communication service over communication network 301. External entity 310 could comprise any individual or organization that provides a data analysis service for the service provider. External entity 310 could comprise an external fix agent. In one embodiment, storage system 308 is not accessible by external entity 310, through the use of a firewall or other data security techniques known to those skilled in the art.

Figure 4:
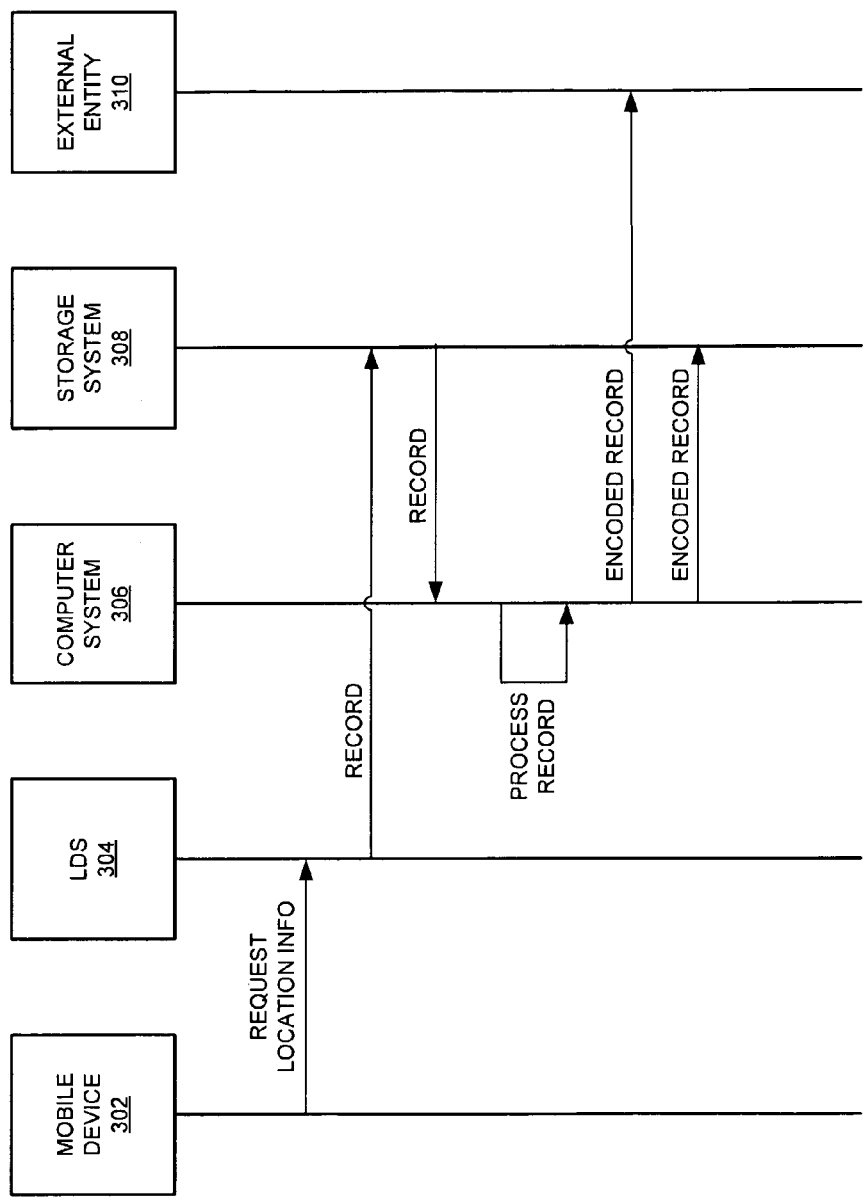
FIG. 4 is a sequence diagram that illustrates an operation of a communication system.

FIG. 4 is a sequence diagram that illustrates an operation of communication system 300. Mobile device 302 requests location information from location determination system 304. For example, mobile device 302 may make an emergency call or request a location-based service (LBS) requiring the location of mobile device 302 to be determined. When location determination system 304 determines the location of mobile device 302, at least one record associated with the request is stored in storage system 308. A record could comprise call logs, customer proprietary network information (CPNI), Call Detail Records (CDRs), and other data.

Computer system 306 receives the record from storage system 308. Computer system 306 then encodes the record using a key. The key could comprise any algorithm which modifies the digits and characters of the user information. For example, a simple key could comprise incrementing every digit and character of user information by one. In another example, the encoded user information could be generated by randomizing every digit or character of the user information, in which case the key could comprise a table of the unmodified user information and the corresponding encoded user information. In one embodiment, the plurality of keys is stored in storage system 308.

Computer system 306 then verifies that the encoded user information within the record satisfies the initial format of the user information. For example, if the user information is a ten digit telephone number, computer system 306 verifies that the encoded user information remains in a valid telephone number format. In one embodiment, this verification is achieved by determining that the first and fourth digits of the encoded user information are not a zero or a one. In another embodiment, computer system 306 also verifies that the encoded user information is unique from all other encoded user information.

Upon processing the record by encoding the user information and verifying that the encoded user information satisfies the initial format, computer system 306 transfers the record comprising the encoded user information to external entity 310. External entity 310 can process the record comprising the encoded user information and, advantageously, the record remains usable for simulations, troubleshooting, and other data analysis.

Computer system 306 also transfers the record comprising the encoded user information to storage system 308. Computer system 306 may replace the record comprising the user information in storage system 308 with the record comprising the encoded user information, or may store the record comprising the encoded user information along with the record comprising the user information in storage system 308, or combinations of both.

FIG. 5 illustrates an example call log 501. Call log 501 comprises a list of records, such as the records referred to in FIGS. 2 and 4. The records depicted in call log 501 comprise associated exemplary user information.

Call log 501 has eight fields labeled "KEY", "REC", "SOURCE", "DESTINATION", "DATE", "START TIME", "STOP TIME", and "DURATION". The "KEY" field designates a key used to encode user information contained in a record. The key may indicate the algorithm used to encode the information, that the encoded user information was randomly generated, or some other encoding scheme. The "REC" field indicates an index number associated with a record. The "SOURCE" field indicates the telephone number or serial number of the calling party, while the "DESTINATION" field indicates the telephone number or serial number of the called party. The "DATE", "START TIME", "STOP TIME", and "DURATION" fields indicate attributes of the call associated with the record. Note that call log 501 is illustrative in nature and could contain more than the five records depicted therein.

In call log 501, all of the data is unmodified and has not been encoded. In this example, the user information to be encoded is the information contained in the "SOURCE" and "DESTINATION" fields, but the invention contemplates encoding any or all data contained in each record.

FIG. 6 illustrates an example call log 601. Call log 601 comprises the same data as call log 501, except the user information contained in the "SOURCE" and "DESTINATION" fields has been encoded using the key associated with each record. Thus, the information contained in the "SOURCE" and "DESTINATION" fields of call log 601 comprises encoded user information.

In record 1, the source and destination fields contain ten digit telephone numbers. Every digit of the telephone numbers has been decreased by one, where decreasing a zero by one results in a nine. Thus, the decremented telephone numbers of record 1 in call log 601 are the encoded user information associated with the actual telephone numbers of record 1 in call log 501. In one embodiment, key 1 could be stored which could indicate that the algorithm used to encode record 1 is decrementing each digit by one. In another embodiment, the source and destination numbers of record 1 from call log 501 could be stored in a table along with the corresponding encoded source and destination numbers of record 1 from call log 601. Such a table could be stored in storage system 108. If an additional record were received which indicated 303-999-5566, the source number from call log 501, storage system 108 could be searched to determine the encoded value stored in call log 601, which is 292-888-4455. In this manner, the additional record could be encoded using 292-888-4455, so that the data contained in the additional record could be correlated with the data of record 1, instead of generating a unique number for the additional record.

In record 2, the source and destination fields also contain ten digit telephone numbers. The encoded user information contained in the source and destination fields in record 2 of call log 601 has been randomly generated. The source and destination numbers of record 2 from call log 501 could be stored in a table along with the corresponding encoded source and destination numbers of record 2 from call log 601. Such a table could be stored in storage system 108, and accessed in order to encode additional records containing the same source or destination number of record 2. Note that the random number generated for the destination number of record 2 is 007-823-2794. In one embodiment, because the destination number is a ten digit telephone number and the first digit is a zero, this number would not satisfy the initial format of the destination number in record 2 of call log 501. A valid ten digit telephone number cannot begin with a zero or a one, so performing analysis or a simulation using 007-823-2794 would not provide the same result as using the unmodified value of 571-272-1000. Thus, under this embodiment, a new number for the destination number of record 2 would be randomly generated until a valid ten digit telephone number is selected.

Figure 7:
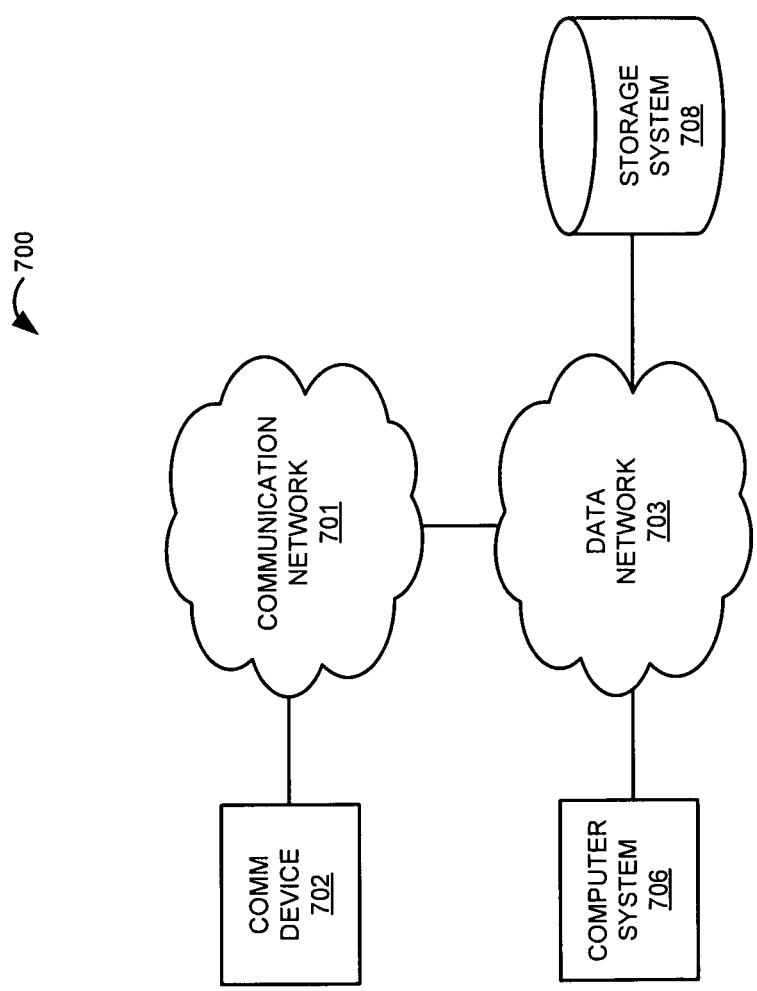
FIG. 7 is a block diagram that illustrates a communication system.

FIG. 7 illustrates communication system 700. FIG. 7 is provided as an example of an alternative communication system in which the methods disclosed herein may find use. Communication system 700 comprises communication network 701, communication device 702, data network 703, computer system 706, and storage system 708. Communication device 702 is in communication with communication network 701. Communication network 701 is in communication with data network 703. Computer system 706 and storage system 708 are in communication with data network 703. Note that the number of communication devices depicted in FIG. 7 would typically be greater, but only a single device is shown herein for clarity.

Communication device 702 may be any device that has communication connectivity capable of transmitting and receiving data. Communication device 702 comprises hardware and circuitry programmed to function as a telecommunications device. For example, communication device 702 could comprise a telephone, transceiver, smartphone, cordless phone, mobile phone, cellular phone, personal digital assistant (PDA), personal communicator, handheld game console, Internet access device, personal computer (PC), Ultra-Mobile personal computer (UMPC), handheld television, terminal adapter, or some other consumer appliance with communication capabilities—including combinations thereof.

Communication device 702 is in communication with communication network 701. Communication device 702 may communicate with communication network 701 using metal, glass, optical fiber, air, space, or some other material as the transport media.

Communication network 701 is capable of providing a communication service to communication device 702. For example, communication network 701 could comprise a packet-switched network, such as the Internet, a public switched telephone network (PSTN), an asynchronous transfer mode (ATM) network, a personal communication service (PCS) network, a local area network (LAN), a wide area network (WAN), a Voice over Internet Protocol (VoIP) network, or any other network that provides a communication service to communication device 702. Moreover, communication network 701 could comprise any of the public switched data networks (PSDNs) such as an Internet Protocol network (Internet), Frame Relay, General Packet Radio Service (GPRS), Ethernet, and others.

Communication network 701 may comprise wireless communication nodes, telephony switches, internet routers, network gateways, computer systems, communication links, or some other type of communication equipment—including combinations thereof. Wireless network protocols that may be utilized by communication network 701 may comprise Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), or any other wireless network protocol that facilitates communication between communication network 701 and communication device 702.

Communication network 701 is in communication with data network 703. Communication network 701 communicates with data network 703 using metal, glass, optical fiber, air, or some other material as the transport media. The communication link between communication network 701 and data network 703 may be a direct link or may include various intermediate communication nodes, systems, or networks.

Data network 703 comprises a communication network capable of providing a communication service to computer system 706 and storage system 708. For example, data network 703 could comprise a packet-switched network, such as the Internet, a cellular network, a public switched telephone network (PSTN), an asynchronous transfer mode (ATM) network, a personal communication service (PCS) network, a local area network (LAN), a wide area network (WAN), or any other network that provides a communication service. Moreover, data network 703 could comprise any of the public switched data networks (PSDNs) such as an Internet Protocol network (Internet), Frame Relay, General Packet Radio Service (GPRS), Ethernet, and others.

Data network 703 may include multiple network elements to facilitate communication between gateways and other communication networks. Data network 703 may include elements that perform network management functions. Examples of network management functions comprise controlling, planning, allocating, deploying, coordinating, and monitoring the resources of a network, including performing functions such as initial network planning, frequency allocation, predetermined traffic routing to support load balancing, cryptographic key distribution authorization, configuration management, fault management, security management, performance management, bandwidth management, and accounting management. Elements that may perform management functions comprise authentication servers, provisioning servers, security servers, billing platforms and any other platform that enables a network provider to manage its network. Data network 703 may also maintain subscriber information associated with users that have permission to utilize data network 703. Data network 703 may also utilize other network elements to provide data connectivity to other networks, such as networking routers.

Figure 8:
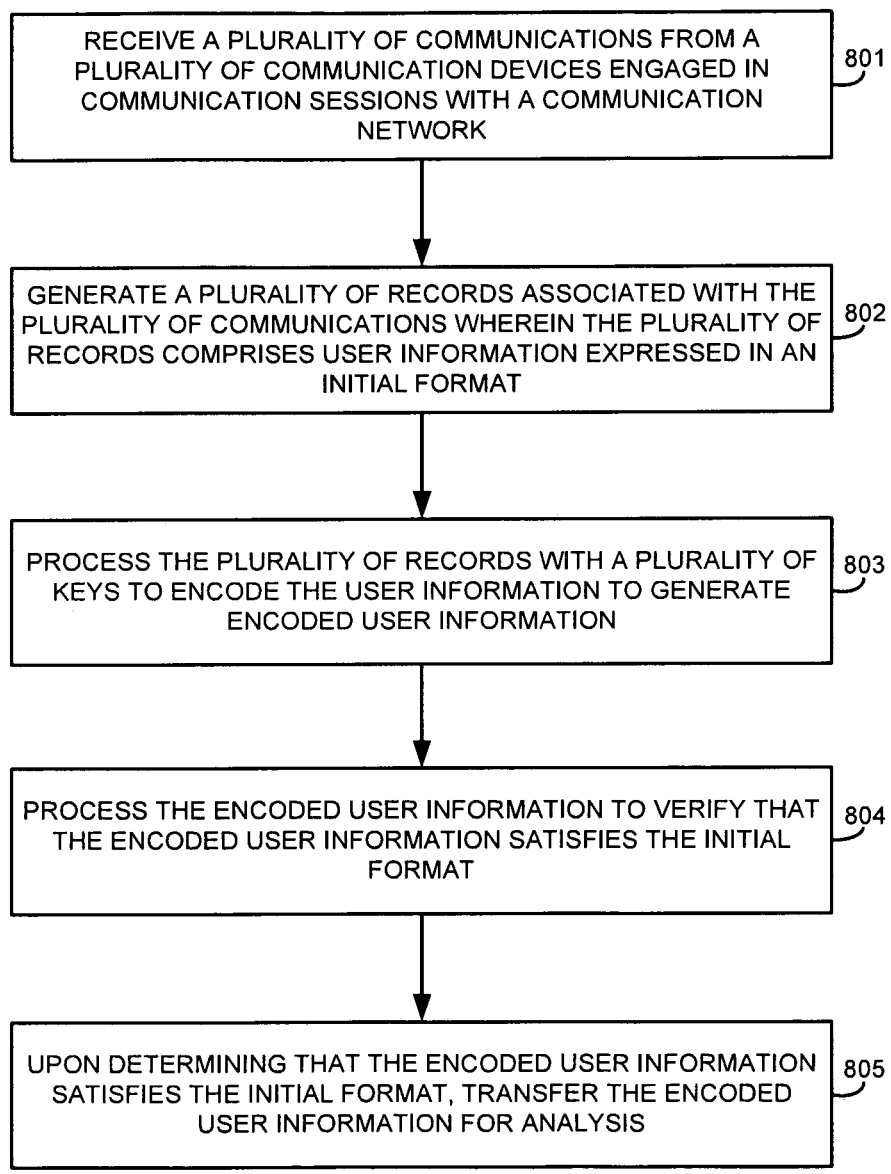
FIG. 8 is a flow diagram that illustrates a method of operation a communication system.

FIG. 8 is a flow diagram that illustrates an operation of communication system 700. The steps of the operation are shown parenthetically. The operation begins with communication network 701 receiving a plurality of communications from a plurality of communication devices such as communication device 702 engaged in communication sessions with communication network 701 (801). Computer system 706 then generates a plurality of records associated with the plurality of communications wherein the plurality of records comprises user information expressed in an initial format (802). The plurality of records could include, for example, Call Detail Records (CDRs), Wireless 911/Safety First (W911/SF) log files, Location Manager (LM) log files, or other call logs. The user information comprises any identifying or sensitive information subject to privacy legislation. Examples of user information include a telephone number, Electronic Serial Number (ESN), Mobile Station Identifier (MSID), Mobile Equipment Identifier (MEID), International Mobile Equipment Identity (IMEI), User Identity Module Identifier (UIMI), or Customer Proprietary Network Information (CPNI).

Computer system 706 processes the plurality of records with a plurality of keys to encode the user information to generate encoded user information (803). The plurality of keys could comprise any algorithm which modifies the digits and characters of the user information. For example, a simple key could comprise incrementing every digit and character of user information by one. In another example, the encoded user information could be generated by randomizing every digit or character of the user information, in which case the key could comprise a table of the unmodified user information and the corresponding encoded user information. In one embodiment, the plurality of keys is stored in storage system 708.

Computer system 706 processes the encoded user information to verify that the encoded user information satisfies the initial format (804). Computer system 706 verifies that the encoded user information satisfies the initial format so that the encoded user information is compatible with simulations and other data analysis procedures performed by external entities. For example, if the user information is a ten digit telephone number, computer system 706 verifies that the encoded user information remains in a valid telephone number format. In one example, this verification is achieved by determining that the first and fourth digits of the encoded user information are not a zero or a one. In another example, computer system 706 also verifies that the encoded user information is unique from all other encoded user information.

Upon determining that the encoded user information satisfies the initial format, computer system 706 transfers the encoded user information for analysis (805). In one example, computer system 706 transfers the encoded user information to storage system 708. Under this example, computer system 706 may replace the user information in storage system 708 with the encoded user information, or may store the encoded user information along with the user information in storage system 708, or combinations of both.

In another example, computer system 706 transfers the encoded user information to an entity internal to a service provider that provides a communication service over communication network 701. The entity internal to the service provider could comprise a department or branch of the service provider, or storage system 708. In another embodiment, computer system 706 transfers the encoded user information to an entity external to the service provider for analysis. The entity external to the service provider could comprise any individual or organization that provides a data analysis service for the service provider. After receiving the encoded user information, the external entity could view and process records comprising the encoded user information and, advantageously, the records would remain usable for simulations, troubleshooting, and other data analysis.

Figure 9:
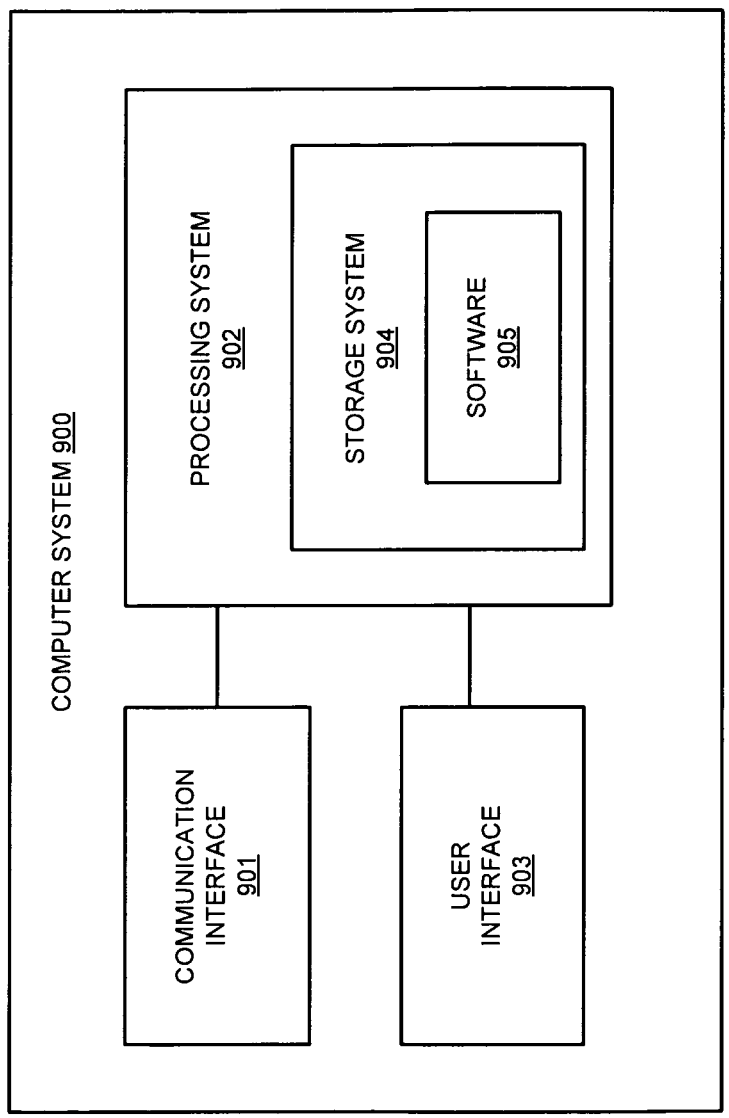
FIG. 9 is a block diagram that illustrates a computer system.

FIG. 9 illustrates computer system 900. Computer system 900 provides an example of computer systems 106, 306, and 706, although systems 106, 306, and 706 may use other configurations. Computer system 900 comprises communication interface 901, processing system 902, and user interface 903. Processing system 902 includes storage system 904. Storage system 904 stores software 905. Processing system 902 is linked to communication interface 901 and user interface 903. Computer system 900 could be comprised of a programmed general-purpose computer, although those skilled in the art will appreciate that programmable or special purpose circuitry and equipment may be used. Computer system 900 may be distributed among multiple devices that together comprise elements 901-905.

Communication interface 901 comprises components that transmit and receive communication signals under the control of processing system 902. These components include transceiver and signal processing circuitry. For example, communication interface 901 could comprise a network interface, modem, port, transceiver, or some other communication device. The received communication signals include a plurality of communications. The transmitted communication signals comprise encoded user information. Communication interface 901 may be distributed among multiple communication devices.

Processing system 902 comprises microprocessor and associated circuitry that retrieves and executes operating software 905 from storage system 904. Processing system 902 may be distributed among multiple processing devices. User interface 903 could comprise a keyboard, mouse, voice recognition interface, microphone and speakers, graphical display, touch screen, or some other type of user device. User interface 903 may be distributed among multiple user devices. Storage system 904 comprises a disk drive, flash drive, memory circuitry, server, or some other memory device. Storage system 904 may be distributed among multiple memory devices. Operating software 905 comprises computer programs, firmware, or some other form of machine-readable processing instructions. Although storage system 904 is shown within computer system 900, a portion of storage system 904 could be externally located. For example, storage system 904 may comprise an external memory apparatus that stores software 905 for subsequent transfer to an internal memory device within computer system 900.

When executed by processing system 902, operating software 905 directs processing system 902 to operate computer system 900 as described herein. In particular, communication interface 901 receives a plurality of communications requesting location information for a plurality of mobile devices engaged in communication sessions with a communication network. Processing system 902 generates a plurality of records associated with the plurality of communications wherein the plurality of records comprises user information expressed in an initial format. Processing system 902 processes the plurality of records with a plurality of keys to encode the user information to generate encoded user information. Processing system 902 processes the encoded user information to verify that the encoded user information satisfies the initial format. Upon determining that the encoded user information satisfies the initial format, communication interface 901 transfers the encoded user information for analysis.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   receiving a plurality of communications requesting location information for a plurality of mobile devices engaged in communication sessions with a communication network;
   generating a plurality of records associated with the plurality of communications wherein the plurality of records comprises user information expressed in an initial format;
   processing the plurality of records with a plurality of keys to encode the user information to generate encoded user information;
   processing the encoded user information to verify that the encoded user information satisfies the initial format, wherein processing the encoded user information to verify that the encoded user information satisfies the initial format comprises verifying that the first three digits of the encoded user information do not indicate a service;
   upon determining that the encoded user information satisfies the initial format, transferring the encoded user information for analysis;
   receiving an additional record after the plurality of communications, wherein the additional record comprises additional user information;

determining a record of the plurality of records associated with the additional record;

determining a key of the plurality of keys used to encode the encoded user information of the record; and encoding the additional user information of the additional record using the key.

2. The method of claim 1 wherein transferring the encoded user information comprises transferring the encoded user information to an entity external to a service provider that provides a communication service over the communication network.

3. The method of claim 1 wherein transferring the encoded user information comprises transferring the encoded user information to an entity internal to a service provider that provides a communication service over the communication network.

4. The method of claim 1 wherein processing the encoded user information to verify that the encoded user information satisfies the initial format comprises verifying that the encoded user information is unique from all other encoded user information.

5. The method of claim 1 wherein processing the encoded user information to verify that the encoded user information satisfies the initial format comprises verifying that the first and fourth digits of the encoded user information are not a zero or a one.

6. The method of claim 1 wherein the user information comprises Customer Proprietary Network Information (CPNI).

7. The method of claim 1 wherein the user information comprises an Electronic Serial Number (ESN).

8. The method of claim 1 wherein the user information comprises a Mobile Equipment Identifier (MEID).

9. The method of claim 1 wherein the user information comprises an International Mobile Equipment Identity (IMEI).

10. A computer system comprising:

a communication interface configured to receive a plurality of communications requesting location information for a plurality of mobile devices engaged in communication sessions with a communication network;

a processing system configured to generate a plurality of records associated with the plurality of communications wherein the plurality of records comprises user information expressed in an initial format, process the plurality of records with a plurality of keys to encode the user information to generate encoded user information, and process the encoded user information to verify that the encoded user information satisfies the initial format, wherein the processing system configured to process the encoded user information to verify that the encoded user information satisfies the initial format comprises the processing system configured to verify that the first three digits of the encoded user information do not indicate a service;

upon determining that the encoded user information satisfies the initial format, the communication interface configured to transfer the encoded user information for analysis;

the communication interface configured to receive an additional record after the plurality of communications, wherein the additional record comprises additional user information; and the processing system configured to determine a record of the plurality of records associated with the additional record, determine a key of the plurality of keys used to encode the encoded user information of the record, and encode the additional user information of the additional record using the key.

11. The system of claim 10 wherein the communication interface configured to transfer the encoded user information comprises the communication interface configured to transfer the encoded user information to an entity external to a service provider that provides a communication service over the communication network.

12. The system of claim 10 wherein the communication interface configured to transfer the encoded user information comprises the communication interface configured to transfer the encoded user information to an entity internal to a service provider that provides a communication service over the communication network.

13. The system of claim 10 wherein the processing system configured to process the encoded user information to verify that the encoded user information satisfies the initial format comprises the processing system configured to process the encoded user information to verify that the encoded user information is unique from all other encoded user information.

14. The system of claim 10 wherein the processing system configured to process the encoded user information to verify that the encoded user information satisfies the initial format comprises the processing system configured to process the encoded user information to verify that the first and fourth digits of the encoded user information are not a zero or a one.

15. The system of claim 10 wherein the user information comprises Customer Proprietary Network Information (CPNI).

16. The system of claim 10 wherein the user information comprises an Electronic Serial Number (ESN).

17. The system of claim 10 wherein the user information comprises a Mobile Equipment Identifier (MEID).

18. A method of operating a communication system, the method comprising:

receiving a plurality of communications from a plurality of communication devices engaged in communication sessions with a communication network;

generating a plurality of records associated with the plurality of communications wherein the plurality of records comprises user information expressed in an initial format;

processing the plurality of records with a plurality of keys to encode the user information to generate encoded user information;

processing the encoded user information to verify that the encoded user information satisfies the initial format, wherein processing the encoded user information to verify that the encoded user information satisfies the initial format comprises verifying that the first three digits of the encoded user information do not indicate a service;

receiving additional communications from the plurality of communication devices;

generating an additional record associated with the additional communications, wherein the additional record comprises additional user information;

determining a record of the plurality of records associated with the additional record;

determining a key of the plurality of keys used to encode the encoded user information of the record; and encoding the additional user information of the additional record using the key.

* * * * *